United States Patent [19]

Katada et al.

[11] 4,292,942
[45] Oct. 6, 1981

[54] IGNITION SYSTEM FOR INTERNAL COMBUSTION ENGINES

[75] Inventors: Hiroshi Katada, Katsuta; Yoshito Kyogoku, Mito, both of Japan

[73] Assignee: Hitachi, Ltd., Tokyo, Japan

[21] Appl. No.: 109,506

[22] Filed: Jan. 4, 1980

[30] Foreign Application Priority Data

Jan. 10, 1979 [JP] Japan .................... 54-681

[51] Int. Cl.$^3$ ................................. F02P 5/08
[52] U.S. Cl. ...................... 123/418; 123/427; 123/417; 123/415; 123/609
[58] Field of Search ............... 123/427, 417, 415, 418, 123/609, 610, 611

[56] References Cited

U.S. PATENT DOCUMENTS

| | | | |
|---|---|---|---|
| 3,202,146 | 8/1965 | Short et al. | 123/415 |
| 3,587,552 | 6/1971 | Varaut | 123/615 |
| 3,888,220 | 6/1975 | Bigalke et al. | 123/418 |
| 3,923,022 | 12/1975 | Scholl | 123/415 |
| 4,066,968 | 1/1978 | Guipaud | 123/418 |
| 4,122,807 | 10/1978 | Hosaka et al. | 123/415 |

Primary Examiner—Charles J. Myhre
Assistant Examiner—R. A. Nelli
Attorney, Agent, or Firm—Craig and Antonelli

[57] ABSTRACT

An ignition system for an internal combustion engine. The ignition system comprises a pulser for generating positive and negative output pulses responsive to the rotation of the engine, a DC power source and an ignition coil having a primary coil connected across the DC power source via a controllable current switching element. The system further comprises a control circuit for controlling the switching element which includes triangular wave generators for generating different triangular wave signals in response to the positive and negative output pulses of the pulser, respectively, a first comparator for comparing a first output signal of one triangular wave generator with a signal which is formed by multiplying a second output signal of the other triangular wave generator by a constant and adding it with a fixed voltage, and a second comparator for comparing the second output signal with a signal which is formed by multiplying the first output signal by a constant and adding it with a fixed voltage. Output terminals of the first and second comparators are connected to the controllable switching element for the ignition primary coil, whereby the output of one comparator controls the conduction start position of primary coil current of the ignition coil and the output of the other comparator controls the ignition position.

4 Claims, 3 Drawing Figures

IGNITION SYSTEM FOR INTERNAL COMBUSTION ENGINES

BACKGROUND OF THE INVENTION

1. Field of the Invention

This invention relates to an ignition system for internal combustion engines and more particularly to an ignition system which performs the advancement of ignition angle electronically.

2. Description of Prior Art

It is disclosed in U.S. Pat. No. 3,202,146 patented Aug. 24, 1965 and entitled "STATIC TRANSISTORIZED IGNITION SYSTEM" that a monostable multivibrator is used to turn on a final stage power transistor for a fixed period. This prior art system is advantageous in that the generation of spark is stable for low and high rotation speeds of the engine and current consumption is reduced at low rotation speed since the primary current is always passed to the ignition coil for the fixed period, but it is disadvantageous in that the ignition position tends to become irregular owing to irregular operation of the monostable multivibrator since the ignition is started after the conduction start position has been determined and the monostable multivibrator has reached its quasi-stable state. Further, if the pulsating rotation during low speed operation causes the engine rotation to decrease rapidly near the upper dead point of the engine, an excessively early ignition position results.

One may refer to U.S. Pat. No. 3,587,552 patented June 28, 1971 and entitled "AUTOMATIC ADVANCE ELECTRONIC IGNITION DEVICE FOR INTERNAL COMBUSTION ENGINES" as another relevant prior art. This prior art employing a monostable multivibrator for turning off a final stage power transistor of an ignition control circuit for a fixed period is, however, disadvantageous in that the current conduction rate is large at low engine rotation speed with current consumption maximized so that heat generation in the ignition coil and the power transistor is increased.

SUMMARY OF THE INVENTION

An object of the present invention is to provide an ignition system for an internal combustion engine which can control the conduction start position of ignition coil primary current and the ignition position.

According to the invention, the ignition system comprises a pulser for generating positive and negative output pulses responsive to the rotation of the engine, a DC power source, and an ignition coil having a primary coil connected across the DC power source via a controllable current switching element.

The ignition system further comprises a control circuit for controlling the switching element which includes triangular wave generator means for generating two triangular wave signals in response to the positive and negative output pulses of the pulser, first comparator means for comparing a first output signal of the triangular generator means with a signal which is formed by multiplying a second output signal of the triangular generator means by a constant and adding it with a fixed voltage, and second comparator means for comparing the second output signal with a signal which is formed by multiplying the first output signal by a constant and adding it with a fixed voltage.

Output terminals of the first and second comparator means are connected to the control element for the ignition primary coil, whereby the output of one comparator means controls the conduction start position of primary coil current of the ignition coil and the output of the other comparator means controls the ignition position.

DESCRIPTION OF THE PREFERRED EMBODIMENT

Figure 1:
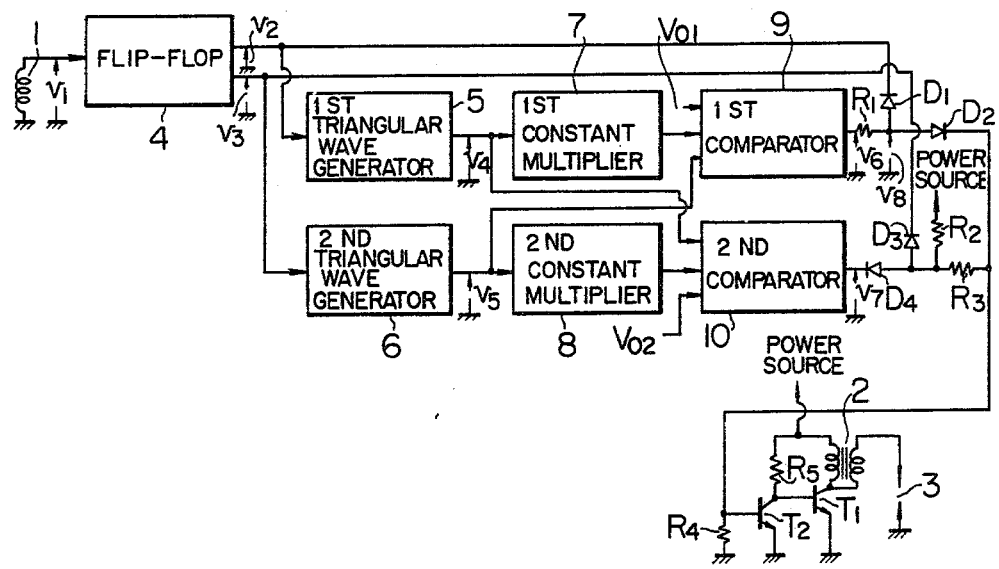
FIG. 1 is a circuit diagram showing once embodiment of the invention.

Referring now to FIG. 1, there is shown a preferred embodiment of the present invention which comprises a pulser 1 for detecting the rotational position of a crank shaft, and a flip-flop circuit 4 connected to an output terminal of the pulser 1. The pulser 1 senses a change of magnetic flux created by a magnetic rotor rotating in synchronism with the crank shaft to produce an output signal. One output terminal of the flip-flop 4 is connected to a first triangular wave generator circuit 5 and the other to a second triangular wave generator circuit 6. The first triangular wave generator circuit 5 is connected with a first constant multiplier circuit 7 and also with a second comparator circuit 10. Similarly, the second triangular wave generator circuit 6 is followed by a second constant multiplier circuit 8 and a first comparator circuit 9.

The first comparator circuit 9 is also connected to receive an output signal of the first constant multiplier circuit 7 and supplied with a fixed voltage $V_{01}$ for its drive. The output terminal of the first comparator circuit 9 is connected to the anodes of diodes D1 and D2 via a resistor R1. Similarly, the second comparator circuit 10 is also connected to receive an output signal of the second constant multiplier circuit 8 and supplied with a fixed voltage $V_{02}$ for its drive. The output terminal of the second comparator circuit 10 is connected to the cathode of a diode D4. The anode of the diode D4 is led to the anode of a diode D3 and, via a resistor R3, to the base of a transistor T2 which controls primary current of an ignition coil. The diode D4 is fed from a power source via a resistor R2.

The diode D1 has its cathode connected to the one output terminal of the flip-flop 4. The diode D2 has its cathode connected with the base of control transistor T2 which in turn is grounded via a resistor R4. This control transistor T2 has its collector fed from the power source via a resistor R5 and its emitter connected to ground. The collector of the control transistor T2 is also connected to the base of a switching transistor T1 whose emitter is grounded. The collector of the switching transistor T1 is connected with an ignition coil 2 having a primary coil fed from the power source and a secondary coil connected to an ignition plug 3.

Figure 2:
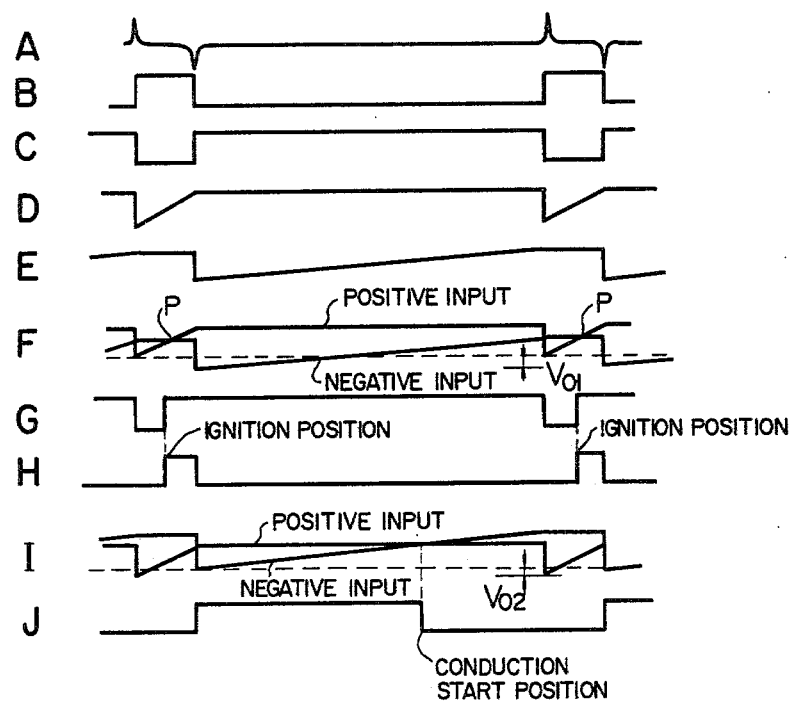
FIG. 2 is a wave form diagram showing operational wave forms in the circuit of FIG. 1.

In operation, the pulser 1 generates, as shown in FIG. 2 at A, a positive output pulse is produced at the position lagged with respect to an advanced angle (corresponding to point P) and a negative output pulse is produced at the position led with respect to the advance angle, and these output pulses drive the flip-flop 4. The flip-flop 4 then produces positive and negative output signals as shown in FIG. 2 at B and C in response to the outputs of the pulser 1. The output signal of wave form B (see $V_2$ in FIG. 1) drives the first triangular wave generator circuit 5 to produce therefrom a triangular wave signal as shown in FIG. 2 at D whereas the output signal of wave form C drives the second triangular wave generator circuit 6 to produce therefrom a triangular wave signal as shown at E.

The output signal of the first triangular wave generator circuit 5 is multiplied by a constant at the first constant multiplier circuit 7 so that the advance angle characteristic can be in accord with the conduction start position of the switching transistor T1 for various rotation speeds of the crank shaft. The multiplied signal is added to the fixed voltage $V_{01}$ at the first comparator circuit 9. The first comparator circuit 9 also receives the output signal of the second triangular wave generator circuit 6 as described above. By receiving these signals being shown in FIG. 2 at F, the first comparator circuit 9 compares the raised and multiplied triangular wave with the triangular wave from the generator circuit 6 to produce an output signal as shown at G, thus determining an angular position at which the ignition occurs and which corresponds to a cross point P of the first and second triangular waves.

The output E of the second triangular wave generator 6 is also multiplied by a constant at the second constant multiplier circuit 8 to ensure that the conduction start position of the switching transistor T1 can be controlled for various rotation speeds of the crank shaft. The multiplied signal is added to the fixed voltage $V_{02}$ at the second comparator circuit 10. As described above, the second comparator circuit 10 also receives the output signal of the first triangular wave generator circuit 5. By receiving these signals shown in FIG. 2 at I, the second comparator circuit 10 compares the raised and multiplied triangular wave with the triangular wave from the first triangular generator circuit 5 to produce an output signal as shown at J.

Incidentally, the output signal wave form G of the first comparator circuit 9 comprises a noise component, therefore the wave form G and wave form B are ANDed to form a signal as shown in FIG. 2 at H. Further, at low rotation speeds below idling rotation, it follows that the outputs of the triangular wave generator circuits 5 and 6 tend to be saturated to the voltage of the power source, resulting in failure to effect the complete operational performance. To attend this problem, in accordance with the invention, the control transistor T2 and the switching transistor T1 are controlled directly, within the low rotation speed range, by the output signal of the flip-flop 4 by the aid of the diode D3 so that the current conduction angle can be controlled to be constant. It is also preferred for the low speed rotation that the constant multiplier circuit be comprised of a resistor voltage divider circuit, because one of the outputs of the comparator circuits 9 and 10 can always be fixed to a low level with the other fixed to a high level when the triangular waves become saturated to thereby ensure a stable operation at low rotation speeds.

The output signals of the comparator circuits 9 and 10 are connected through the diodes D2 and D4 such that wave form J is followed by wave form H, and supplied to the base of the control transistor T2 for drive of the switching transistor T1. The resistor R1 acts to protect the output circuit of the first comparator circuit 9 when the first comparator circuit 9 produces a high level output and the flip-flop 4 produces a low level of output wave form B. The resistors R2, R3 and R4 are provided for setting the bias of the control transistor T2 and the resistor R5 is inserted for passing base current of the switching transistor T1. The switching transistor T1 is turned on to start current passing to the ignition coil 2 and is then turned off at the ignition position to generate a high voltage across the ignition coil with consequent generation of a spark across the spark plug 3, thereby igniting the internal combustion engine.

Figure 3:
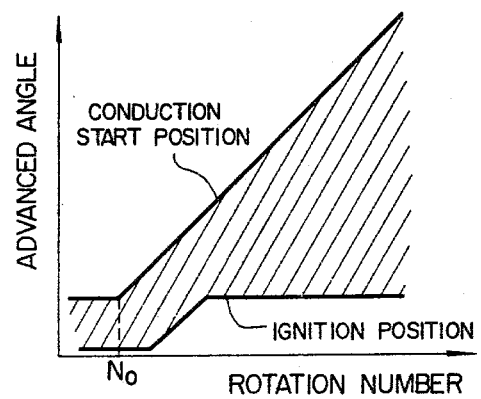
FIG. 3 is a graph showing the relation between engine rotation number and advanced angle.

With the ignition controlling as described above, it is possible to provide an ignition system of such a characteristic as shown in FIG. 3 wherein for crank shaft rotation speeds above a specified value $N_o$, the conduction start position increases in direct proportion to the rotation speed. The ignition position, on the other hand, is determined pursuant to wave form H. Accordingly, the switching transistor, which is turned on at the conduction start position and turned off at the ignition position, can conduct for a fixed period as will be seen from FIG. 3.

With the ignition system as constructed above wherein triangular wave signals are formed responsive to the positive and negative output signals of the pulser, one of the triangular wave output signals is compared with a signal which is formed by multiplying the other output signal by a constant and adding it with a fixed voltage to control the ignition primary current, and the other of the triangular wave output signals is compared with a signal which is formed by multiplying the one triangular wave output signal by a constant and adding it with a fixed voltage to control the ignition position, the advance angle characteristic which matches the engine rotation speed can be obtained electronically with ease. The electronic control system can be more compact and immune from aging affect than the mechanical control system and can be highly reliable and durable.

It is to be noted that a digital control based on a microcomputer may be applied to the above described ignition control circuit in accordance with teachings of the present invention.

What is claimed is:

1. An ignition system for an internal combustion engine comprising:
   a pulser for producing positive and negative output pulses responsive to the rotation of the engine;
   first triangular wave generator means for generating a triangular wave output signal in response to the positive output pulse of said pulser;
   second triangular wave generator means for generating a triangular wave output signal in response to the negative output pulse of said pulser;
   a first constant multiplier circuit multiplying the output signal of said first triangular wave generator means by a constant to produce an output signal;
   a second constant multiplier circuit multiplying the output signal of said second triangular wave generator means by a constant to produce an output signal;
   first comparator circuit means comparing the output signal of said first triangular wave generator means with a signal which is formed by adding the output signal of said second constant multiplier circuit with a fixed voltage to produce an output signal which controls the current conduction start position of ignition coil primary current; and
   second comparator circuit means comparing the output signal of said second triangular wave generator means with a signal which is formed by adding the output signal of said first constant multiplier circuit with a fixed voltage to produce an output signal which controls the ignition position of the engine.

2. An ignition system for an internal combustion engine according to claim 1 wherein said first and second constant multiplier circuits include each a resistor voltage divider circuit.

3. An ignition system for an internal combustion engine according to claim 1 which comprises a flip-flop connected between an output terminal of said pulser and said first and second triangular wave generator means.

4. An ignition system for an internal combustion engine according to claim 3 wherein said first comparator circuit means has an output terminal connected via a diode to one output terminal of the flip-flop and the base of a control transistor for the ignition coil primary current, and said second comparator circuit means has an output terminal connected via a diode to the other output terminal of said flip-flop and the base of said transistor.

* * * * *